Dec. 12, 1950     C. C. LINDSAY     2,534,041
BELT DRIVE ASSEMBLY
Filed Jan. 10, 1946
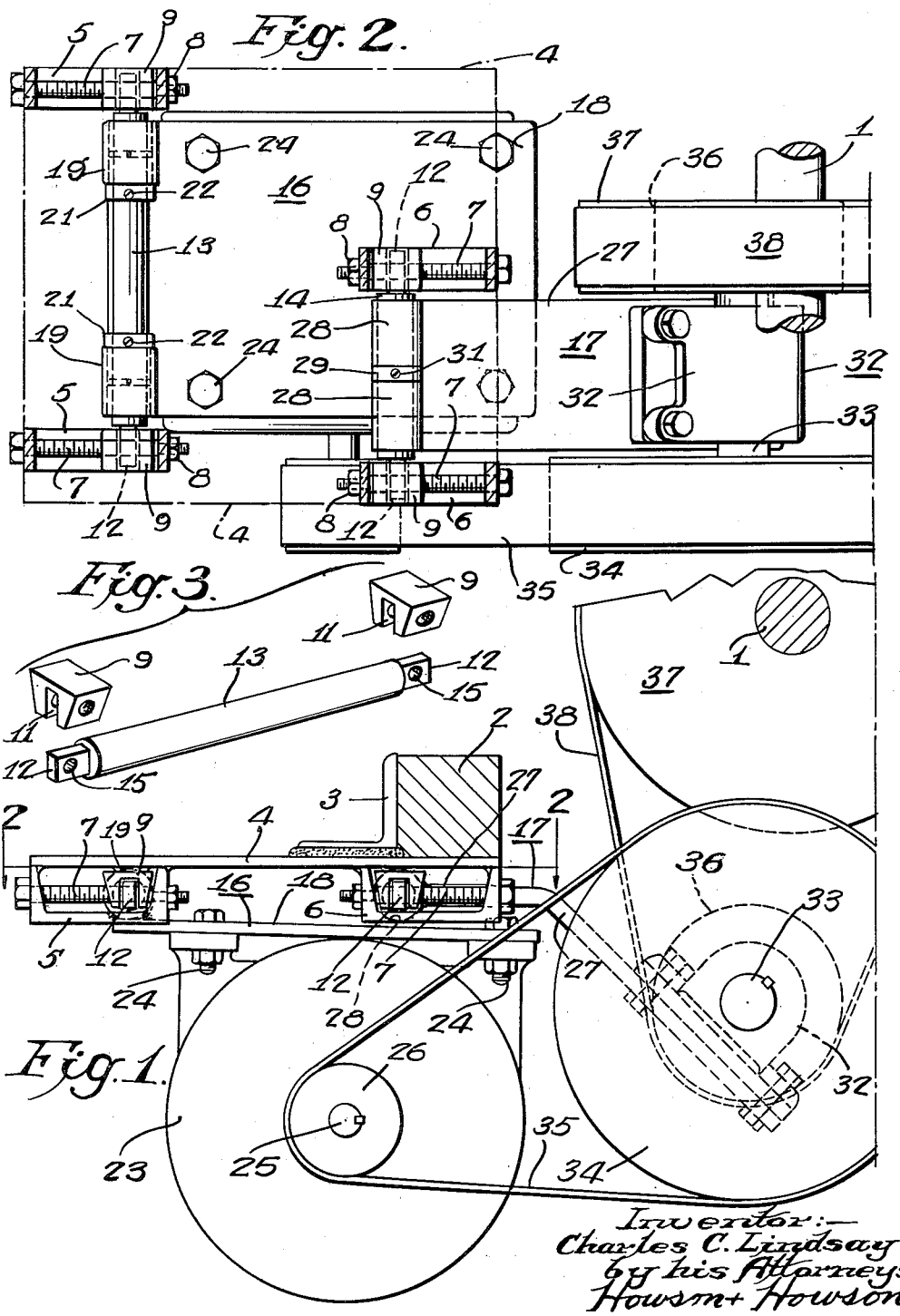
Inventor:—
Charles C. Lindsay
by his Attorneys
Howson + Howson Patented Dec. 12, 1950

2,534,041

UNITED STATES PATENT OFFICE 2,534,041

BELT DRIVE ASSEMBLY

Charles C. Lindsay, Roanoke, Ala.

Application January 10, 1946, Serial No. 640,149

5 Claims. (Cl. 74—242.14)

This invention relates to belt-drive assemblies, and a principal object of the invention is to provide an assembly of this class which shall be compact in form and free from structural complication, and which shall be readily adjustable to compensate for stretching of the belt elements and to maintain the desired belt tensions.

In the attached drawings,

Fig. 1 is a vertical sectional view illustrating the assembly in side elevation;

Fig 2 is a section on the line 2—2, Fig. 1, and

Fig. 3 is an exploded view illustrating certain elements of the assembly.

With reference to the drawings, wherein the invention is shown as applied to a belt drive for draper looms, the primary drive shaft of the loom is indicated at 1, and 2 designates an element of the fixed structure of the loom in which the shaft 1 is journaled. Attached to the element 2, through the medium in the present instance of an angle bar 3, is a plate 4, and to the under side of this plate are attached, by means for example, of welding, two sets of channel sections indicated respectively by the reference numerals 5—5 and 6—6. The channels 5 and 6 are identical in form, and each has mounted therein a screw 7 which extends across the channel from one vertical leg to the other. The screws 7 are mounted for rotation in the supporting channel elements and each is provided at its terminal end with a lock nut 8 by means of which the screw may be immobilized. In threaded engagement with each of the screws is a rider 9, and this rider may be adjusted to desired position between the legs of the associated channel by rotation of the screw, the upper surface of the rider seating slidably against the under surface of the plate 4 and being thereby prevented from rotating about the axis of the screw.

Each of the riders is recessed, from the under side in the present instance, as illustrated in Fig. 3, the recess being designated by the reference numeral 11, and these recesses are adapted for reception of the flattened terminal end portions 12 of pins 13 and 14 which in assembly extend between the channel sections of the respective pairs. The pins 13 and 14 are identical as to form, except that the pin 13 is of greater length than the pin 14 as required by the greater spacing of the channel elements 5—5 as compared with the elements 6—6. The flattened ends 12 of these pins are apertured, as indicated at 15, for passage therethrough of the screws 7, but these apertures are unthreaded so that as the riders 9 are adjusted axially of the screws 7, the ends of the pins 13 and 14 slide freely on the pins.

The pins 13 and 14 function respectively as hinge pintles for a pair of brackets which have been designated generally by the reference numerals 16 and 17. The brackets 16 consists of a plate 18 to one end of which are welded a pair of spaced aligned sleeves 19—19. In assembly these sleeves embrace the pin 13, and preferably the sleeves are provided with bronze or other suitable liners to neatly fit the outer surface of the pin 13. The bracket 16 is held axially of the pin 13 by a pair of collars 21—21 which are secured to the pin 13 by set screws 22 in positions abutting the proximate ends of the sleeves 19, see Fig. 2. The plate 18 constitutes a support for an electric motor 23 which is suspended from the under side of the plate by bolts 24. The shaft 25 of this motor is provided with a pulley 26.

The bracket 17 consists of a plate 27 having at one end a pair of spaced aligned sleeves 28—28. These sleeves in assembly embrace the pin 14 so as to provide a pivotal connection between the bracket 17 and the plate 4. In assembly the sleeves 28 are located axially of the pin 14 by a collar 29 which fits neatly between the proximate ends of the sleeves and is secured to the pin 14 by a set screw 31. To the other end of the plate 27 is secured a bearing structure designated generally by the reference numeral 32, and in this bearing is journaled a shaft 33 which projects at both sides of the bearing. To one end of the shaft 33 is secured a pulley 34 which is in alignment with the pulley 26 of the motor shaft 25, and in the assembly these pulleys are operatively connected by a belt 35. At its opposite end the shaft 33 carries a second pulley 36 which is in alignment with a pulley 37 on the shaft 1. The pulleys 36 and 37 are operatively connected by a belt 38.

From the foregoing description it will be apparent that the bracket 17, which in effect is pivotally connected to the plate 4 on an axis through the pin 14, is supported and held in a suspended position by the belt 38. Similarly the motor bracket 16, pivotally attached to the plate 4 on an axis through the pin 13, is supported in a position of suspension by the belt 35. The weight of the motor maintains the belt 35 in taut condition and the belt 38 is tensioned by the weight of the bracket 17 plus the additional load imposed by the weight of the motor 23. The original effective lengths of the belts 35 and 38 are such that the brackets 16 and 17 are supported approximately in the positions illustrated in the drawings, and the bracket assembly is designed so that in these positions of the parts the belts will be properly tensioned. The adjustments afforded by the screws 7 are calculated to return the elements relatively to substantially the original positions after elongation of the belts has resulted in a change in the original relation. Thus compensation for elongation of the belt 38 may be effected by adjustment of the screws 7 associated with the pin 14 to move the pin, and with it the bracket 17, to the right as viewed in the drawings. The resulting adjustment of the shaft 33 and pulleys 34 and 36 is substantially in line with the belt 35, or in other words with a line connecting the centers of the motor shaft 25 and pulley shaft 33. It will be apparent that any stretching of the belt 38 will manifest itself in a clockwise movement of the motor bracket 16 about its pivot on the pin 13, and that the aforesaid compensatory adjustment of the bracket 17 will have also the effect of reelevating the bracket 16 to or near its original position. The diagram of forces effecting the tensions of the belts 35 and 38 remains substantially unchanged. Similarly elongation of the belt 35 may be compensated without material modification of the original relation of the parts by adjustment of the screws 7 associated with the pin 13 to move the latter to the left as viewed in the drawings, this adjustment having the effect of returning the bracket 18 to its original angular position without, however, materially affecting the position of the bracket 17.

It will be understood that the assembly is subject to modification without departure from the invention as defined in the appended claims.

I claim:

1. In a belt-drive assembly, a main supporting member for said assembly, a driven shaft, a motor pivoted to said main supporting member, an intermediate pulley-shaft pivoted to said main supporting member on a pivot independent of the pivot for said motor, and drive belts operatively connecting the intermediate shaft with the motor and with the driven shaft respectively, said motor and intermediate shaft being supported in positions of suspension from said driven shaft by said belts and being movable by gravity about their respective independent pivots to take up slack in said belts.

2. In a belt-drive assembly, a driven shaft, an intermediate pulley shaft parallel to and below said driven shaft, a motor laterally positioned with respect to said intermediate shaft with the rotational axis thereof parallel to said shafts, means for mounting said intermediate shaft and motor for movement independently about pivotal axes respectively paralleling the axes of the intermediate shaft and motor, drive belts operatively connecting the intermediate shaft with the motor and with the driven shaft respectively and suspending said intermediate shaft and motor in elevated positions on said pivotal axes so as to tension the belts gravitationally in accordance with the masses of the suspended parts and the positions of said pivotal axes with respect to the centers of mass and to each other, and means for adjusting said pivotal axes in a plane approximately parallel to the plane containing the axes of the motor and said intermediate shaft so as to compensate for changes in tension of the belts resulting from elongation of the latter.

3. In a belt-drive assembly, a main supporting member for said assembly, a driven shaft, a motor pivoted to said main supporting member, an intermediate pulley-shaft pivoted to said main supporting member on a pivot independent of the pivot for said motor, drive belts operatively connecting the intermediate shaft wtih the motor and with the driven shaft respectively, said motor and intermediate shaft being supported in positions of suspension from said driven shaft by said belts and being movable by gravity about their respective independent pivots to take up slack in said belts, and means for adjusting the paths of movement of said motor and intermediate shaft so as to substantially maintain a predetermined tension in the belts by restoring the initial vertical component of the mass of the motor and intermediate pulley-shaft.

4. In a belt-drive assembly, a main supporting member for said assembly, a driven shaft, a motor pivoted to said main supporting member, an intermediate pulley-shaft pivoted to said main supporting member on a pivot independent of the pivot for said motor, drive belts operatively connecting the intermediate shaft with the motor and with the driven shaft respectively, said motor and intermediate shaft being supported in positions of suspension from said driven shaft by said belts and being movable by gravity about their respective independent pivots to compensate for elongation of the belts, and means for selectively adjusting the positions of said independent pivots so as to maintain a substantially constant belt tension.

5. In a belt-drive assembly, a main supporting member for said assembly, a driven shaft, a motor below said driven shaft, an intermediate pulley-shaft below said driven shaft and above said motor, drive belts operatively connecting the intermediate shaft with the motor and with the driven shaft respectively, said motor and intermediate shaft being pivotally mounted on said main supporting member on independent pivots and being suspended by said belts in elevated positions on said independent pivots so as to tension the belts gravitationally in accordance with the masses of the suspended parts and the positions of said independent pivots with respect to the centers of mass and to each other, and means for adjusting said independent pivots on said main supporting member in directions to substantially compensate for changes in tension of the belts resulting from elongation of the latter.

CHARLES C. LINDSAY.

REFERENCES CITED

The following references are of record in the file of this patent:

UNITED STATES PATENTS

| Number | Name | Date |
| --- | --- | --- |
| 615,904 | Richards | Dec. 13, 1898 |
| 899,741 | Lane et al. | Sept. 29, 1908 |
| 2,075,297 | O'Brien | Mar. 30, 1937 |
| 2,311,993 | Olsen | Feb. 23, 1943 |
| 2,341,992 | Jarrett | Feb. 15, 1944 |